US011416877B2

(12) United States Patent
Basu et al.

(10) Patent No.: US 11,416,877 B2
(45) Date of Patent: Aug. 16, 2022

(54) EXTRACTING PRODUCT DRAG EFFECT FROM TRANSACTION RECORDS

(71) Applicant: INTERNATIONAL BUSINESS MACHINES CORPORATION, Armonk, NY (US)

(72) Inventors: Aditya Basu, New York, NY (US); Jeanine C. Chong, Armonk, NY (US); Dinesh Garg, Beawar (IN); Alankar Jain, Pittsburgh, PA (US); Aswin Kannan, Chennai (IN); Ramasuri Narayanam, Guntur (IN); Mark S. Squillante, Greenwich, CT (US); Christian Toft-Nielsen, New Canaan, CT (US); Jessica Lee Yau, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 15/715,529

(22) Filed: Sep. 26, 2017

(65) Prior Publication Data

US 2019/0095932 A1 Mar. 28, 2019

(51) Int. Cl.
*G06Q 30/00* (2012.01)
*G06Q 30/02* (2012.01)
*G06Q 40/00* (2012.01)

(52) U.S. Cl.
CPC ........ *G06Q 30/0201* (2013.01); *G06Q 40/12* (2013.12)

(58) Field of Classification Search
None
See application file for complete search history.

(56) References Cited

U.S. PATENT DOCUMENTS

| 8,015,140 | B2 | 9/2011 | Kumar et al. |
| 8,265,989 | B2 * | 9/2012 | Dodge ............... G06Q 30/0202 705/14.1 |
| 8,452,763 | B1 | 5/2013 | Pasca |
| 8,731,995 | B2 | 5/2014 | Sun et al. |
| 9,002,857 | B2 | 4/2015 | Robinson et al. |

(Continued)

OTHER PUBLICATIONS

Gedenk et al., Sales Promotion, Aug. 29, 2017, Tuck School of Business at Dartmouth, pp. 303-317, printed through www.archive.org (Year: 2017).*

(Continued)

*Primary Examiner* — Naresh Vig
(74) *Attorney, Agent, or Firm* — Alexis N. Hatzis

(57) ABSTRACT

A method, computer system, and a computer program product for computing a product drag effect is provided. The present invention may include receiving a plurality of transaction record data. The present invention may then include tuning a plurality of parameters based on the received transaction record data. The present invention may further include determining a product drag frequency based on the authorized parameter tuning and received transaction record data. The present invention may then include calculating a drag probability based on the determined product drag frequency. The present invention may then include deriving an observation from the calculated drag probability. The present invention may lastly include outputting the derived observation to a user.

20 Claims, 10 Drawing Sheets

(56) References Cited

U.S. PATENT DOCUMENTS

| | | | |
|---|---|---|---|
| 9,576,299 B1* | 2/2017 | Ramalingam | G06Q 20/22 |
| 2001/0014868 A1* | 8/2001 | Herz | G06Q 30/0269 |
| | | | 705/26.1 |
| 2003/0208399 A1* | 11/2003 | Basak | G06Q 30/02 |
| | | | 705/14.53 |
| 2005/0273380 A1 | 12/2005 | Schroeder et al. | |
| 2007/0094067 A1* | 4/2007 | Kumar | G06Q 30/0201 |
| | | | 705/26.2 |
| 2008/0021765 A1* | 1/2008 | Cereghini | G06Q 30/02 |
| | | | 705/7.31 |
| 2010/0287029 A1* | 11/2010 | Dodge | G06Q 30/02 |
| | | | 705/7.31 |
| 2011/0119148 A1* | 5/2011 | Yoshii | G06Q 30/0204 |
| | | | 705/26.7 |
| 2013/0198022 A1 | 8/2013 | Zhang | |
| 2014/0095307 A1* | 4/2014 | Dodson | G06Q 30/0255 |
| | | | 705/14.53 |
| 2014/0156347 A1 | 6/2014 | Agrawal et al. | |
| 2014/0180811 A1 | 6/2014 | Boal | |
| 2014/0229202 A1 | 8/2014 | Bogle et al. | |
| 2014/0244368 A1 | 8/2014 | Singhania et al. | |
| 2016/0132811 A1 | 5/2016 | Davar et al. | |

OTHER PUBLICATIONS

Shwetank Maurya, What is the largest value of the probability of an event's occurrence?, Jan. 19, 2017, www.socratic.org (Year: 2017).*

Guide to analyzing the overall lift of retail promotion, Nov. 13, 2012, www.crosscap.com (Year: 2012).*

Wes Nichols, Advertising Analytics 2.0, Mar. 2013, Harvard Business Publishing (Year: 2013).*

Graphs, Aug. 8, 2015, Northern Illinois University, printed through www.archive.org (date is in the URL in YYYYMMDD format) (Year: 2015).*

Nejad et al., "Influentials and Influence Mechanisms in New Product Diffusion", 2014, Journal of Marketing Theory and Practice, vol. 22, No. 2 (spring 2014), pp. 185-207 (Year: 2014).*

Aral et al., "Identifying Influential and Susceptible Members of Social Networks", Jul. 20, 2012, Science Megazine, vol. 337, Issue 6092, pp. 337-341 (Year: 2012).*

Howard et al., "A Method For Correcting Item-Total Correlations For The Effect of Relevant Item Inclusion", Dec. 1, 1962, SAGE Journals, Educational and Psychological Measurement, vol. XXII, No. 4 (Year: 1962).*

Jobs Admin, Marketing Analytics—Essential of Cross-Selling and Upselling, Aug. 10, 2015, AnalyticsVidhya.com (Year: 2015).*

Jobs Admin, Effective Cross Selling using Market Basket Analysis, Aug. 4, 2014, AnalyticsVidhya.com (Year: 2014).*

Xiang Dai, A Network-Based Recommendation Algorithm, 2018, IEEE ICCIA.2018.00018, pp. 52-58 (Year: 2018).*

Agrawal et al., "Fast Algorithms for Mining Association Rules," Proceedings of the 20th VLDB Conference, 1994, p. 487-499, Santiago, Chile.

Borgelt, "Frequent Pattern Mining," Slides for Courses, Jun. 7, 2017, p. 1-536, University of Konstanz School of Computer Science, Konstanz, Germany.

Kamakura et al., "Cross-Selling Through Database Marketing: A Mixed Data Factor Analyzer for Data Augmentation and Prediction," International Journal of Research in Marketing, Mar. 2003, p. 45-65, vol. 20, Issue 1, Elsevier Science B.V.

Kleinberg, "Authoritative Sources in a Hyperlinked Environment," Proceedings of the Ninth Annual ACM-SIAM Symposium on Discrete Algorithms (SODA '98), Jan. 25-27, 1998, p. 668-677, San Francisco, California, USA.

Mathworks, "Features—Optimization Toolbox," MATLAB Products, p. 1-16, The MathWorks, Inc., https://www.mathworks.com/products/optimization/features.html, Accessed on Aug. 7, 2017.

Mell et al., "The NIST Definition of Cloud Computing," National Institute of Standards and Technology, Sep. 2011, p. 1-3, Special Publication 800-145.

Mihaescu et al., "Mining Frequent Itemsets—Apriori Algorithm," Algorithms for Information Retrieval Laboratory Module 8, Apr. 25, 2012, 9 Pages, University of Craiova.

Mori et al., "Computing the Potential Profit of a Sales Item from Cross-Selling Relationships," International Journal of Machine Learning and Computing, Dec. 2012, p. 754-757, vol. 2, No. 6.

* cited by examiner

| Customer ID | Products Purchased |
|---|---|
| 1 | $(P_1, P_2, P_8)$ |
| 2 | $(P_2, P_5, P_6, P_9)$ |
| 3 | $(P_1)$ |
| 4 | $(P_5, P_{10})$ |
| ... | |
| N | $(P_5, P_7)$ |

| | Leader | | | | |
|---|---|---|---|---|---|
| Follower | $P_1$ | $P_2$ | ... | $P_i$ | ... |
| $P_1$ | $f_{11} = \dfrac{N_{11}}{N_1}$ | $f_{21} = \dfrac{N_{21}}{N_2}$ | ... | $f_{i1} = \dfrac{N_{i1}}{N_i}$ | ... |
| $P_2$ | $f_{12} = \dfrac{N_{12}}{N_1}$ | $f_{22} = \dfrac{N_{22}}{N_2}$ | ... | $f_{i2} = \dfrac{N_{i2}}{N_i}$ | ... |
| $P_3$ | $f_{13} = \dfrac{N_{13}}{N_1}$ | $f_{23} = \dfrac{N_{23}}{N_2}$ | ... | $f_{i3} = \dfrac{N_{i3}}{N_i}$ | ... |
| ... | ... | ... | ... | ... | ... |
| $P_j$ | $f_{1j} = \dfrac{N_{1j}}{N_1}$ | $f_{2j} = \dfrac{N_{2j}}{N_2}$ | ... | $f_{ij} = \dfrac{N_{ij}}{N_i}$ | ... |
| ... | ... | ... | ... | ... | ... |

FIG. 5

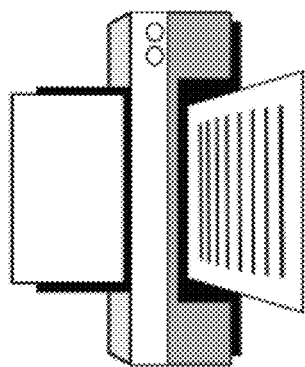
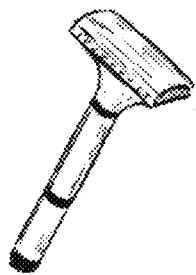
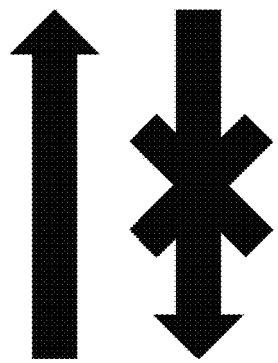
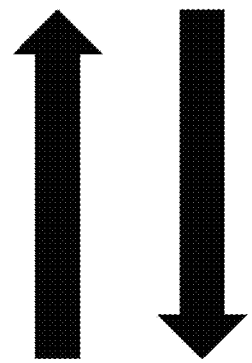
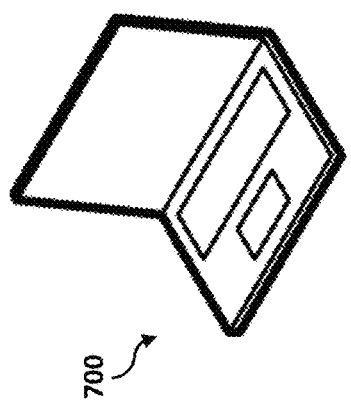
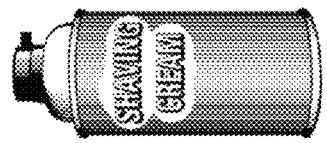
FIG. 7A
FIG. 7B

EXTRACTING PRODUCT DRAG EFFECT FROM TRANSACTION RECORDS

BACKGROUND

The present invention relates generally to the field of computing, and more particularly to analytics and optimization.

A transaction record may be generated each time a customer purchases a product or set of products from a store. Given the number of transaction records the store may generate daily, a large corpus of transaction record data may be gathered by the store over time. By analyzing the transaction record data, the store may determine the drag effect that one product has on another. Leader products may be identified as those that drag other products, and follower products may be identified as those that are dragged by leader products. This information may provide useful observations for both retail sellers and buyers. Given budget caps and a desired strategic focus, retail sellers strive for optimal allocations of development, marketing and sales investments. By determining the drag effect that one product has on another, a retail seller may, for example, be aided in optimizing the organization's portfolio by using the leader-follower scores to limit unnecessary expenditure and increase profits.

SUMMARY

Embodiments of the present invention disclose a method, computer system, and a computer program product for computing a product drag effect. The present invention may include receiving a plurality of transaction record data. The present invention may then include tuning a plurality of parameters based on the received transaction record data. The present invention may further include determining a product drag frequency based on the authorized parameter tuning and received transaction record data. The present invention may then include calculating a drag probability based on the determined product drag frequency. The present invention may then include deriving an observation from the calculated drag probability. The present invention may lastly include outputting the derived observation to a user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 illustrates an example of a transaction record table according to at least one embodiment;

FIG. 5 is a frequency matrix constructed by the leader-follower program 110a, 110b according to at least one embodiment;

FIG. 7A is a sample non-mutual drag effect according to at least one embodiment;

FIG. 7B is a sample mutual drag effect according to at least one embodiment;

DETAILED DESCRIPTION

Figure 1:
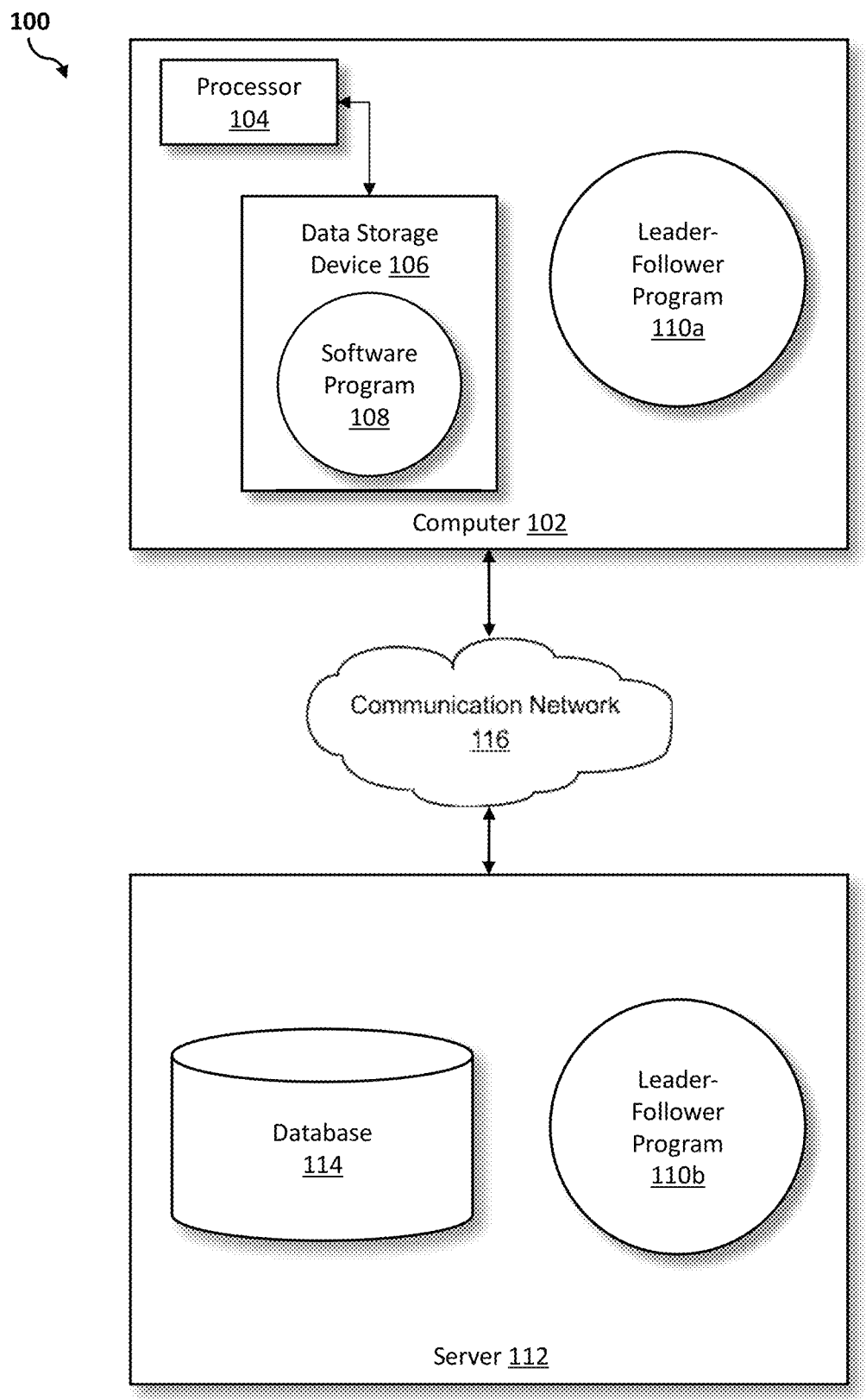
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for extracting a product drag effect from transaction records in the form of leader-follower scores. As such, the present embodiment has the capacity to improve the technical field of analytics and optimization by utilizing transaction records to estimate leader-follower scores based on statistical analysis. More specifically, transaction records may be inputted into the program for extracting a product drag effect. Transaction records may include product and revenue history, along with corresponding physical attributes, physical parameters, and analytic tunable parameters. A user of the program may then be permitted to tune parameters associated with the inputted transaction records. The program for extracting a product drag effect may then determine the product drag frequency and use the determined product drag frequency to calculate the drag probability. Thereafter, observations may be derived from the calculated drag probabilities, including the pairwise drag effect, the top-k local leaders and followers, the leader and follower scores, and the top-k global leaders and followers. The program for extracting a product drag effect may then output results to the user.

As described previously, a transaction record may be generated each time a customer purchases a product or a set of products from a store. Given the number of transaction records the store may generate daily, a large corpus of transaction record data may be gathered by the store over time. By analyzing the transaction record data, the store may determine the drag effect that one product has on another. Leader products may be identified as those that drag other products, and follower products may be identified as those that are dragged by leader products. This information may provide useful observations for both retail sellers and buyers. Given budget caps and a desired strategic focus, retail sellers strive for optimal allocations of development, marketing and sales investments. By determining the drag effect that one product has on another, a retail seller may, for example, be aided in optimizing the organization's portfolio by using the leader-follower scores to limit unnecessary expenditure and increase profits.

Given any two products, it is possible that each one of them may drag the other, potentially with differing intensities. Depending on the relative intensity of the drag effect between the two products, one product may be considered a leader product and the other a follower product. A leader product may be one which leads a buyer to purchase other products, and a follower product may be one which is purchased based the fact that one or more leader products have also been purchased. However, the co-occurrence of products across transaction record data may not be sufficient to determine the associations and connections between products, and further may not disclose the direction and magnitude of the drag effect of one product on another.

Therefore, it may be advantageous to, among other things, extract the product drag effect from transaction records in the form of leader-follower scores and to estimate the direction and magnitude of the extracted drag effect. Thereafter, top-k local and global leader and follower products may also be identified. The results may be based on a user's configuration of tunable attributes, and may be outputted to the user. The user may further configure the resulting output.

According to at least one embodiment, the leader-follower program may be useful in offering business intelligence to the user by mining collected transaction record data from an inputted database to derive business observations. The program may take as input a database of transaction record data collected by a retail store. Each piece of transaction record data may represent products sold to a customer by the retail store. The transaction records may contain information concerning the customer type, product design attributes, and product classifications. The leader-follower program may permit the user to tune relevant parameters to compute the product drag effect based on desired constraints. In computing the product drag effect, the leader-follower program may determine the product drag frequency and utilize the determined frequency to calculate the drag probability. The drag probability, in turn, may reveal several observations concerning the collected transaction record data. The results of the leader-follower program may be outputted to the user and may be further customized and restricted in the output screen based on the user's desired content.

According to at least one embodiment, the drag probabilities may reveal the magnitude of pairwise drag effect $P_{ij}$, defined as the probability of product j being dragged by product i. The pairwise drag effect may estimate the direction and magnitude of product drag based on inputted transaction record data, and may provide results in the form of a drag probability matrix. The drag probabilities may also reveal the top-k local and global leaders and followers, for example, the top-k products that are dragged by and are dragging another product given a local and global area constraint. The drag probabilities may further reveal the leader and follower scores which capture the overall magnitude of the drag relationship.

According to at least one embodiment, the leader-follower program may be comprised of a feedback-based system that may permit business decisions to be learned from information corresponding to an inputted dataset. The leader-follower program may receive as input transaction record data and may determine drag frequencies and may calculate drag probabilities. The user may then derive observations based on the received transaction record data. For example, a corporation operating with 2017's specification of products, attributes, prices, and corresponding customer information, may use the leader-follower program to compute an analysis of global leader products, global follower products, and derive an exact revenue drag. This may lead to business decisions concerning the pricing of certain products, the benefit of sales of a product to a given demographic of customers, any necessary marketing modifications, and any necessary development expenses. These decisions may lead to a modification of products sold and an updated pricing plan for the year 2018. The transaction record data generated during the year 2018 may thereafter be taken as input to the leader-follower program to calculate the frequency and revenue drag of the given products. The leader-follower program may therefore become a recursive loop of feedback-based learning.

According to at least one embodiment, the leader-follower program may be useful in the retail, computer services, and banking industries, among others, where the portfolio of products and customers are both massive. This high dimensionality may preclude serial computation of a given drag effect, and may result in a parallel processing regime, where a given dataset and an algorithmic implementation may be located on a cloud, and business analysts may extract select data corresponding to given tunable constraints.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a leader-follower program 110a. The networked computer environment 100 may also include a server 112 that is enabled to run a leader-follower program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 8, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the leader-follower program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the leader-follower program 110a, 110b (respectively) to extract a product drag effect from transaction records in the form of leader-follower scores. The leader-follower method is explained in more detail below with respect to FIGS. 2-7B.

Figure 2:
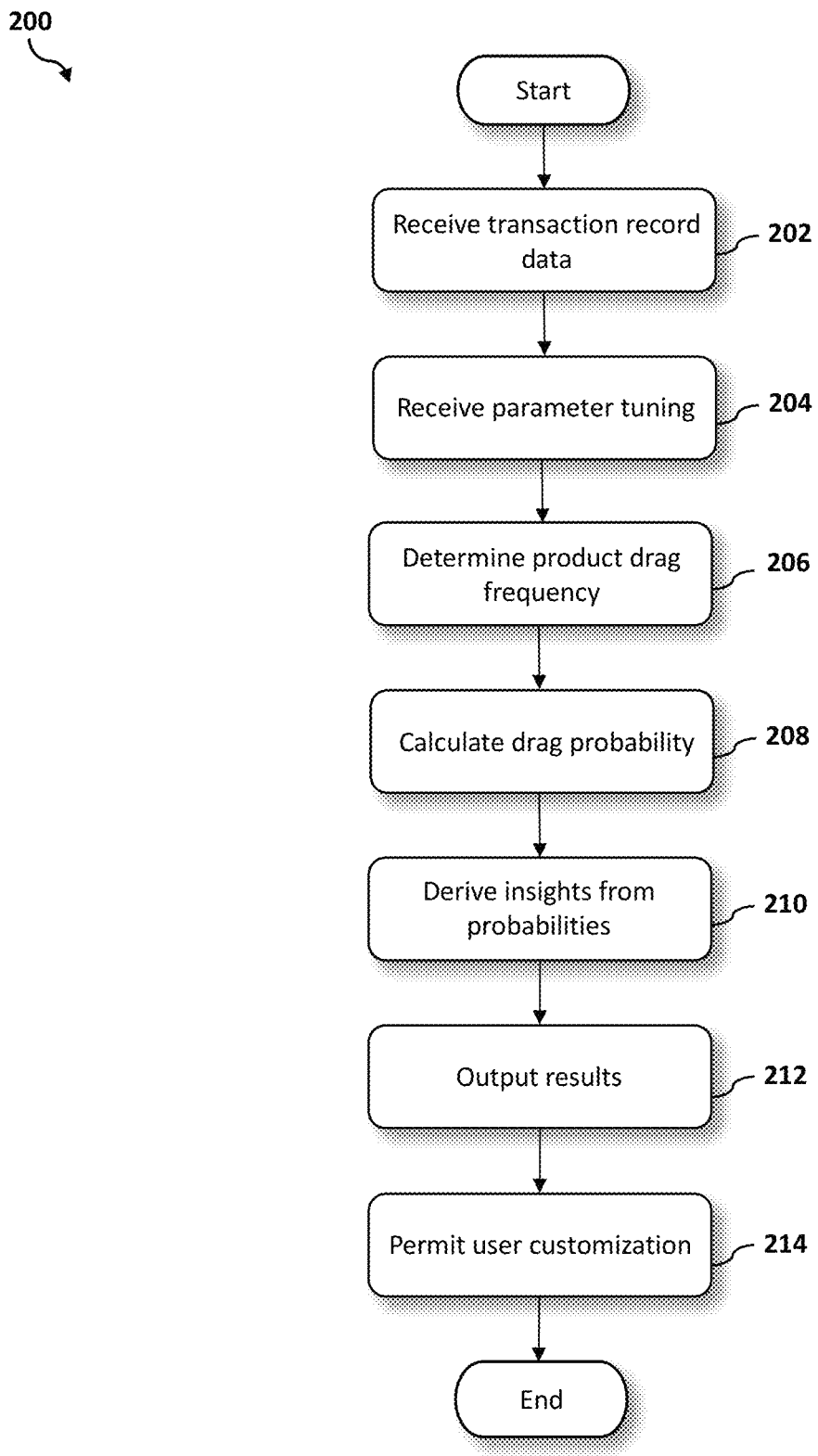
FIG. 2 is an operational flowchart illustrating a process for extracting a product drag effect from transaction records in the form of leader-follower scores according to at least one embodiment.

Referring now to FIG. 2, an operational flowchart illustrating the exemplary leader-follower process 200 used by the leader-follower program 110a and 110b according to at least one embodiment is depicted.

At 202 transaction record data is received by the leader-follower program 110a, 110b. A database of transaction record data may consist of an organization's customer records, where each such record represents the products that the organization sold to one of the organization's customers during a certain specified time period. The records may contain information on the customer type (e.g., customer demographic), product design attributes, and product specifications. The transaction record data may consist of a large set of records amassed by the organization, which may further include transactional purchases of products and their revenues, physical attributes associated with each product, physical parameters, and analytic parameters. Generated transaction record data may reveal that products sold by the organization have variable attributes (e.g., differing sales price of a product when sold to different customers).

Next, at 204 the leader-follower program 110a, 110b receives parameter tuning by the program's user. Physical product attributes such as portability (e.g., cloud or solid state), usability and dimensions (e.g., aesthetics and physical dimensions), storage (e.g., disk space and memory), components (e.g., transistor and dielectric) and maintenance (e.g., servicing type) may be tunable by the program's user. Physical parameters such as window of operation, co-occurrence type, decay factor, customer normalization factor and product weighing factor may also be tunable by the program's user. Lastly, the user may have control over analytic parameters such as time of marketing, promotions and offers (e.g., 20% off), sales medium (e.g., via internet or retail store), target customer type (e.g., automotive purchaser) and target geographic location (e.g., United Kingdom).

Physical product attributes refer to physical design specifications of a product. For example, in the design of an automobile, physical product attributes may refer to engine dimensions, tire radius, transmission shift parameters, and color of the vehicle. The drag effect that one product may have on another may be partly dependent on the attribute specification. Given a set of products purchased by a single customer, knowledge and understanding of physical product attributes may assist the leader-follower program 110a, 110b in determining whether the co-occurrence of any two products is based on a drag effect or is merely a coincidence. For example, if a customer purchases a laptop, bread, and milk, it may be determined that the purchase of the customer's laptop did not influence the purchase of milk, whereas the purchase of bread may have. This determination may be based on the following physical attributes, determined to be the building blocks (e.g., foundation) of each associated product:

Portability: The extent to which a product can be compactly packaged. For example, laptops are considered portable and mainframes are not portable. Laptops may require external storage devices (e.g., hard drives and memory) and the purchase of a laptop may drag these associated items. The purchase of a mainframe computer, conversely, does not drag such external products. In the case of software, the presence or absence of a cloud environment may define portability. For example, if a software product is distributed as an executable file (i.e., .exe), the source code may be written in either C or Fortran and may be distributed without a compiler, therefore resulting in the determination that the purchase of the software product does not drag any corresponding compiler.

Usability and Dimensions: The physical appearance and design of the product. A hardware device may have corresponding weight and dimension data, while a software program may have a graphical user interface (GUI). Several GUI based software products may require a flash player or animation viewer to run, and may automatically drag the same. Heavy hardware devices may require wooden boxes for related packaging and may automatically drag the same. Contrariwise, a customer's purchase of a mobile phone and large shipping carton together may be determined to be a coincidence with no drag relationship.

Storage: The size of information that may be stored. Storage may predominately be an attribute of hardware products. Large storage devices such as internal hard drives, supercomputers, and mainframe devices may require casings and scratch protectors and may automatically drag the same. Low storage devices such as USB drives may not require casings and scratch protectors, and therefore, may not automatically drag the same.

Components: The internal mechanisms. Components of a hardware device may consist of transistors, dielectrics, and metal layers, while components of a software product may consist of scripts and interfaces. For example, cellphones and flashlights are hardware devices which may be made of the previously mentioned components and may require lithium based lubricant products, such as grease, to properly function. Therefore, cellphones and flashlights, based on their component description, may be determined to automatically drag lithium based lubricants. A software product may not drag the same.

Maintenance: The required servicing of a given product. Mechanical products such as automobiles, elevators, computers, and televisions, may require servicing on a regular contractual basis and may be determined to automatically drag purchases of such contracts. Stationary items, such as a pen and paper, on the other hand, may not be associated with any such servicing agreements.

Physical parameters such as the time of year or month that a given product is marketed, or a deal is signed, may assist in dragging other products. For example, a beauty item such as perfume may drag sunscreen during summer months, however this determination may not remain true when the physical parameters are modified to limit analysis to the winter months. Promotions (e.g., temporary price drops), markdowns (e.g., permanent price drops), and discounts automatically increase the probability of dragging other products. For example, a store may run a promotion whereby the store gives a customer product B for free given the customer's purchase of product A. The purchase by customers of product A may increase in that instance, implying that a customer's choice of products or purchase patterns may be dependent on physical marketing parameters. As a second example, a customer may be less likely to purchase a winter jacket with the purchase of a long-sleeve shirt in October or November in Austin, Tex., as compared to a customer with similar purchasing habits located in a different climate in Chicago, Ill. Given the fact that the drag quantification is affected by physical parameters, these may be kept as tunable preferences to be adjusted by the user of the leader-follower program 110a, 110b.

Analytic parameters such as the year(s) that the transaction record data was generated may also be tunable by the user of the leader-follower program 110a, 110b. For example, if the inputted transaction record data pertains to purchases made from 2010-2015, the user may limit the data to the years 2014 or 2015 only for purposes of the drag analysis. A product may be determined to drag another product if the latter is purchased within a certain number of days or months from the purchase of the former product. Modifying the restricted time period (e.g., window of operation) from the purchase of the first product may reveal different drag effects given different modifications. In certain circumstances, the window of operation may not influence the drag effect one product has on another. In other circumstances, the purchase of a product within one month after the purchase of a second product may contribute to a higher determined drag effect of the second product on the first product, as compared to the same products being purchased within three months of each other. The tunable preference given to the user to adjust this analytic parameter may be referred to as decay factor.

The tunable attributes may assist a user in determining whether the co-occurrence of any two products in a customer's transaction is because of coincidence or an established drag effect. Any one of the tunable preferences may be modified separately without modifying all preferences. Different combinations of the tunable preferences may provide a different resulting drag frequency and revenue drag. Further, customers' purchase of the same products may contribute differently to product drag effects based on the other products purchased by the customers during a given transaction.

For example, the leader-follower program 110a, 110b receives as input transaction record data which reveals that a customer purchased two products, A and B, with A being purchased in January and B being purchased in July. The user of the leader-follower program 110a, 110b may configure the analytic parameters such that the window of operation is one year and the decay factor is zero, meaning that products purchased within different months will not affect the drag analysis so long as the products were purchased within the given window of operation. Based on the preconfigured parameters, the leader-follower program 110a, 110b determines that the probability with which product A drags product B is one, and the probability with which product B drags product A is zero. If the window of operation was configured to three months, it would be determined that products A and B do not drag each other and their respective drag probabilities would equal zero. Furthermore, the user of the leader-follower program 110a, 110b may opt to compute revenue drag as opposed to product drag. If product A generated 100 United States Dollars (USD) of revenue and product B generated 20 USD of revenue, the revenue dragged by product A from product B, given a window of operation of one year, would be 20 USD.

Next, at 206, the product drag frequency is determined. The product drag frequency may indicate the number of transactions in which both products $p_i$ and $p_j$ occur. The transaction record table depicted in FIG. 3 represents the co-occurrence of given products and will be discussed in more detail below. The leader-follower program 110a, 110b may construct a complete directed graph across the products for which transaction record data has been received. The determination of the product drag frequency may be based on the constructed directed graph and frequency matrix, both of which will be discussed in more detail below with respect to FIGS. 4-6.

Next, at 208, the drag probability is calculated. By calculating the drag probability, the user may be given an idea about the quantum of drag between any two products $p_i$ and $p_j$. This may be captured by means of the drag probability, denoted as $p_{ij}$. The leader-follower program 110a, 110b may use the frequency counts determined at 206, and may convert the frequency matrix discussed below with respect to FIG. 5 into a drag probability matrix, such that the sum of every row and column in the drag probability matrix may be equal to one. That is, the leader-follower program 110a, 110b may generate a doubly stochastic matrix from the frequency matrix depicted in FIG. 5 by using the following equation:

$$M_{in}[\Sigma_{ij}(p_{ij}-f_{ij})^2 + \Sigma_i(\pi_i-f_i)^2]$$

$$\Sigma_j p_{ij}=1$$

$$\Sigma_i p_{ij}=1$$

$$\Sigma_i \pi_i=1$$

$$\pi p = p$$

$$\pi \geq 0, p \geq 0$$

Next, at 210, observations are derived from the calculated probabilities. Once the user has generated the pairwise drag probabilities, as described previously at 208, the user may obtain several observations from the generated probabilities. The observations may pertain to the ranking of global leader and global follower products for a given product by computing the direction and magnitude of the mutual drag effect while tuning physical product attributes, physical product specifications, and analytic parameters. The derived observations may influence product pricing and expense decisions that consist of promotions (e.g., temporary price drops) and markdowns (e.g., permanent price drops) on leader products that significantly drag revenue from other products, and marketing and development allocations given a product's position in the global leader and follower rank list.

The leader-follower program 110a, 110b may generate the top-k global leader list. Once a user has generated the pairwise drag probabilities, the user may query to obtain a global list of products in ranked order. The ranking method lists the products in order based on a leadership index of $\lambda X(i) + (1-\lambda) Y(i)$, where:

$$X(i) = \frac{(F_i - L_i) - \mu_x}{\sigma_x}$$

$$Y(i) = \frac{\left(\sum_j |a_{ij}|^2 \log(1+a_{ij})\right) - \mu_y}{\sigma_y}$$

$$a_{ij} = |p_{ij} - p_{ji}|$$

Given the above-listed equations, $F_i$ represents the number of products that follow the purchase of product i (e.g., are dragged by the purchase of i or whose purchase is induced by the purchase of product i) and $L_i$ represents the number of products that lead the purchase of product i (e.g., drag the purchase of product i or which cause the purchase of product i).

The leader-follower program 110a, 110b may also generate the top-k global follower list. In a manner similar to the generation of the top-k global leader list, a user may generate a list of top-k global follower products. The rank order may be based on the leadership index of $\lambda X(i)+(1-\lambda)Y(i)$, where $F_i$ represents the number of products that follow the purchase of product i, and $L_i$ represents the number of products that lead the purchase of product i, and the following equations apply:

$$X(i) = \frac{(F_i - L_i) - \mu_x}{\sigma_x}$$

$$Y(i) = \frac{\left(\sum_j |a_{ij}|^2 \log(1 + a_{ij})\right) - \mu_y}{\sigma_y}$$

$$a_{ij} = |p_{ij} - p_{ji}|$$

Likewise, the leader-follower program 110a, 110b may rank products based on the revenue that the products are dragging with them (e.g., revenue generated on products purchased based on the purchase of a given product). To determine a revenue-based rank of products in order of the top-k global leaders, the leader-follower program 110a, 110b may rank the products in decreasing order of their out degrees (e.g., the sum of weights on outgoing arcs in a revenue-based directed graph). To determine a revenue-based rank of products in order of the top-k global followers, the leader-follower program 110a, 110b may rank the products on the fraction of revenue which was generated due to the drag effect of other products. In the case of top-k global followers, the revenue-based rank may list the products in decreasing order of indegrees (e.g., the sum of weights on incoming arcs in a revenue-based directed graph). To determine the top-k local leaders, the leader-follower program 110a, 110b may rank the in-neighbors of $p_i$ (i.e., the revenue received due to the drag effect) in decreasing order of the product's corresponding edge weight in a revenue-based directed graph. Lastly, to determine the top-k local followers, the leader-follower program 110a, 110b may rank the out-neighbors of product $p_i$ in decreasing order of the corresponding edge weight in a revenue-based directed graph.

Next, at 212 results are outputted to the user. The outputted results may, for example, include a leader and follower list in the form of a database file, and may also include business market decisions in the form of a portable document format (PDF) file. As previously stated, the leader-follower program 110a, 110b may reveal useful observations for the retail marketing industry, for web-based recommender systems, for energy markets (e.g., by identifying revenue generating commodities), for the banking and insurance industries (e.g., by identifying insurance policies whose purchase is dragged by the purchase of other insurance policies), and for the travel and leisure industry (e.g., by identifying the drag of hotel and flight on one another).

Lastly, at 214, the user may customize the resulting output. User customization may include further restricting portions of the given output to reveal the information which contains desirable and relevant content.

Referring now to FIG. 3, a transaction record table 300 denoting the number of transactions in which both products $p_i$ and $p_j$ occur is depicted. Quantity $N_i$ denotes the number of transactions in which product $p_i$ occurs, and $N_{ij}$ denotes the number of transactions in which both products $p_i$ and $p_j$ occur. The tunable user parameters discussed previously at 204 may influence the leader-follower program's 110a, 110b determination as to whether the co-occurrence of particular products is based on an established drag effect or is merely a coincidence. Coincident cases may be indicated by low frequency and probability values and may be discarded by the leader-follower program 110a, 110b.

Figure 4:
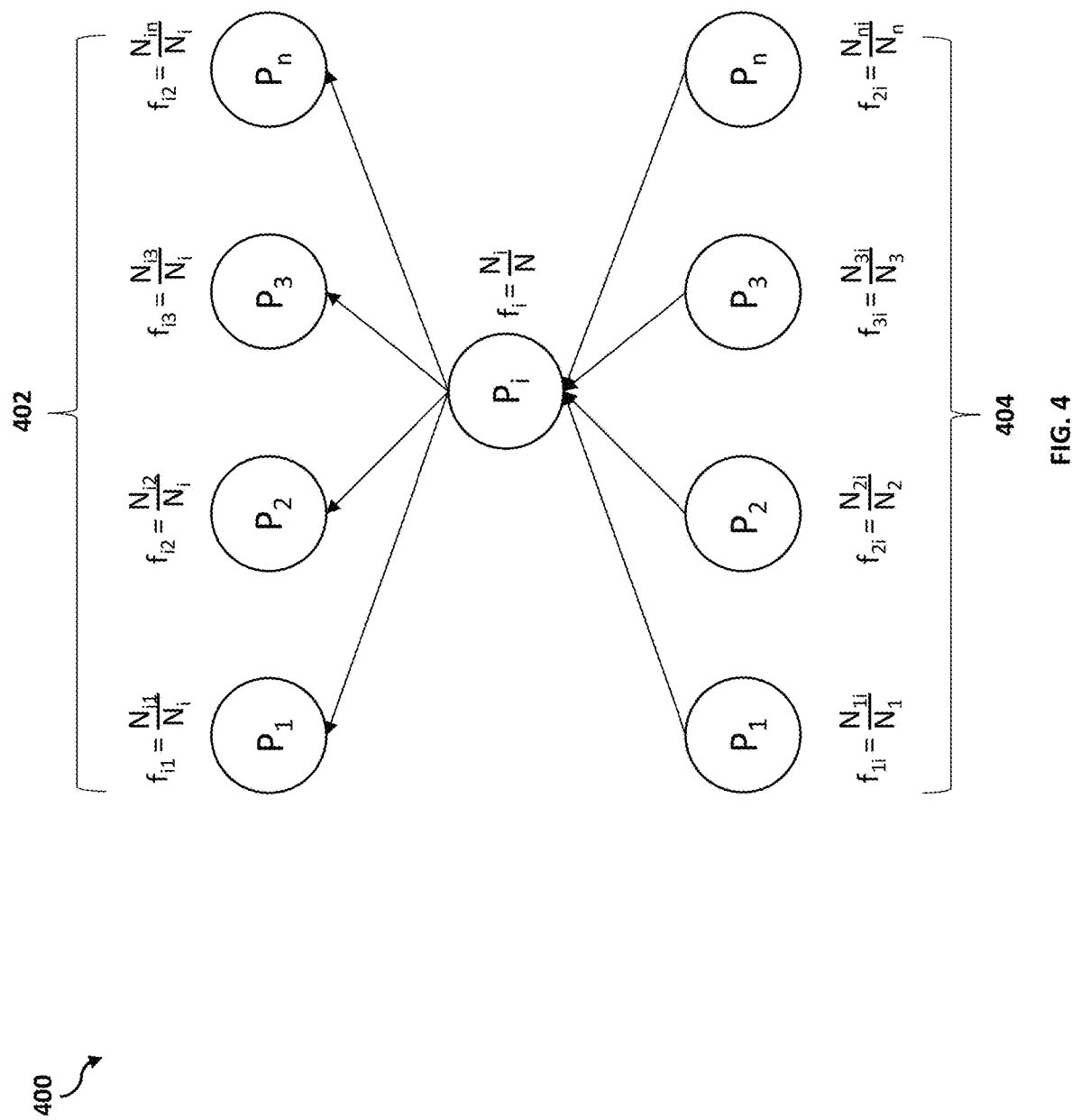
FIG. 4 illustrates an example of a directed graph with product drag frequencies constructed by the leader-follower program 110a, 110b according to at least one embodiment.

Referring now to FIG. 4, a directed graph 400 with product drag frequencies constructed by the leader-follower program 110a, 110b according to at least one embodiment is depicted. The leader-follower program 110a, 110b may construct a complete directed graph 400 across the products for which transaction record data has been received. For each product $p_i$, the directed graph 400 may reveal whether the product is being dragged by or is dragging another product. The top portion of the graph 402 depicts product $p_i$ in a leader role, indicating that the purchase of product $p_i$ drags with it products $p_i$-$p_n$ by a determined probability. The bottom portion of the graph 404 depicts product $p_i$ in a follower role, indicating that the purchase of product $p_i$ follows the purchase of products $p_i$-$p_n$ by a different determined probability.

A product drag frequency may be determined based on the received transaction record data at 202, and may be indicated by the following equation, where fu represents the frequency that product 1 is dragged by the purchase of product i, and N is the total number of transaction records in the data file uploaded by the user.

$$f_{i1} = \frac{N_{i1}}{N_i}$$

The product drag frequency may be treated as merely the proxy for the edge probabilities and not the probabilities themselves. As such, the product drag frequencies need not sum up to one. After computing the product drag frequency, the leader-follower program 110a, 110b may translate the frequencies into corresponding probabilities, as discussed previously at 208.

Referring now to FIG. 5, a frequency matrix 500 constructed by the leader-follower program 110a, 110b according to at least one embodiment is depicted. The frequency matrix 500 may indicate in table format the frequencies of each product given the total number of transactions in the data file uploaded by the user. The frequencies of the frequency matrix may be the same as those depicted on the directed graph 400 as discussed previously with respect to FIG. 4.

Figure 6:
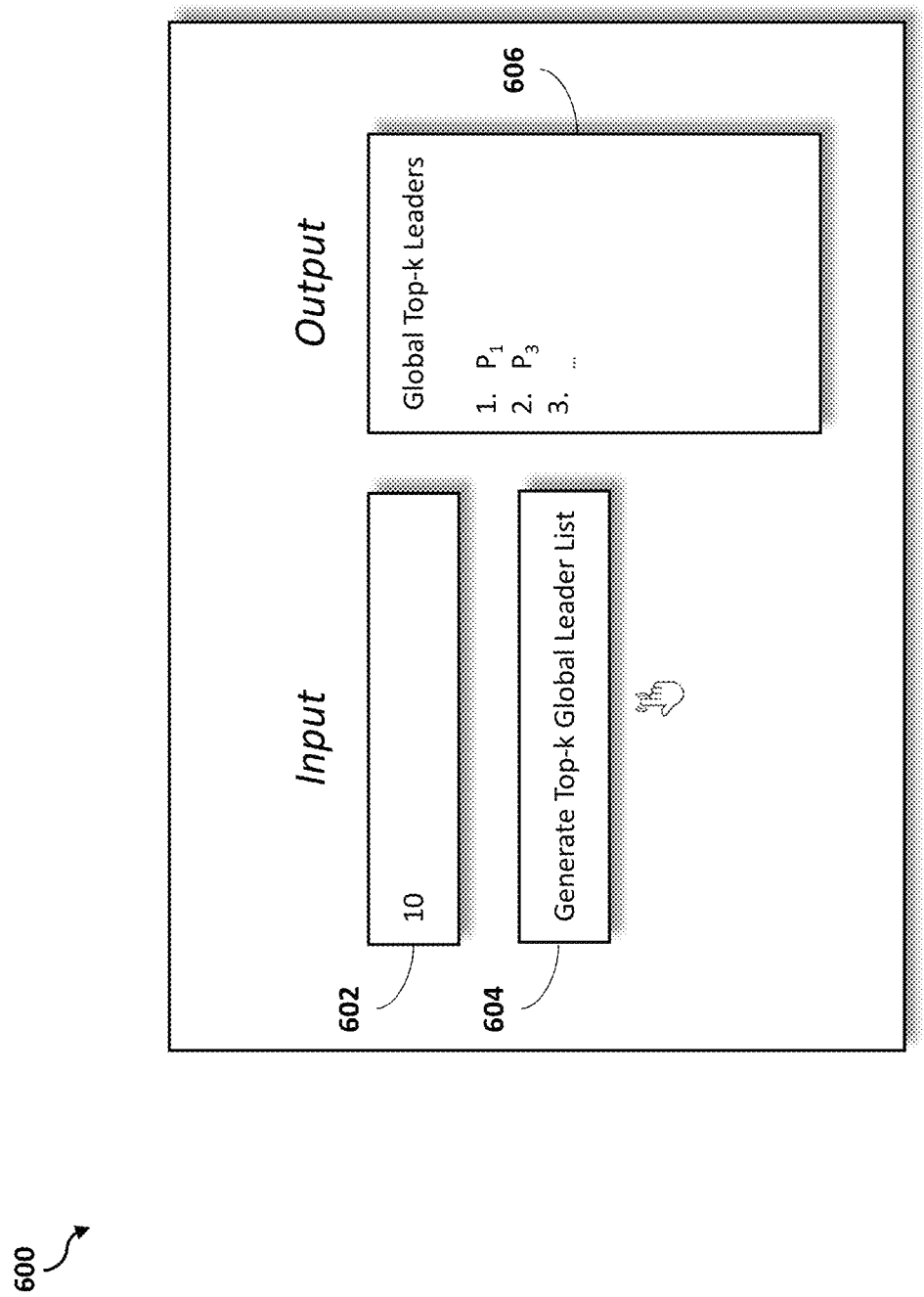
FIG. 6 is a schematic diagram of an example of a user-issued query according to at least one embodiment.

Referring now to FIG. 6, a schematic diagram of a user-issued query 600 according to at least one embodiment is depicted. Once the leader-follower program 110a, 110b has calculated the drag probabilities, as described previously at 208, the user may attempt to obtain several observations from the probabilities. A plurality of transaction record data may be inputted into the leader-follower program 110a, 110b, as described previously at 202, with the number of transaction records reflected at 602. The user may utilize the drop down menu at 604 to select a desired analysis. The user may obtain the top-k global leader list (both product and revenue based), the top-k global follower list (both product and revenue based), the top-k local leader list (both product and revenue based), and the top-k local follower list (both product and revenue based), as discussed previously at 210. The output of the leader-follower program 110a, 110b may be based on the user's selection of a desired analysis and may be reflected at 606.

Referring now to FIGS. 7A and 7B, a sample non-mutual drag effect 700 and mutual drag effect 702 according to at least one embodiment is depicted. As previously described, the leader-follower program 110a, 110b may determine the magnitude and intensity of the drag effect of one product on another. As can be seen in FIG. 7A, the purchase of a laptop drags (e.g., induces) the purchase of a printer, however, conversely, the purchase of a printer does not drag the purchase of a laptop along with it. This may be described as a non-mutual instance of a product drag effect. In FIG. 7B the purchase of shaving cream or the purchase of a razor would each drag each other, possibly with differing intensities, nevertheless resulting in a mutual drag effect.

It may be appreciated that FIGS. 2-7B provide only an illustration of one embodiment and do not imply any limitations with regard to how different embodiments may be implemented. Many modifications to the depicted embodiment(s) may be made based on design and implementation requirements.

Figure 8:
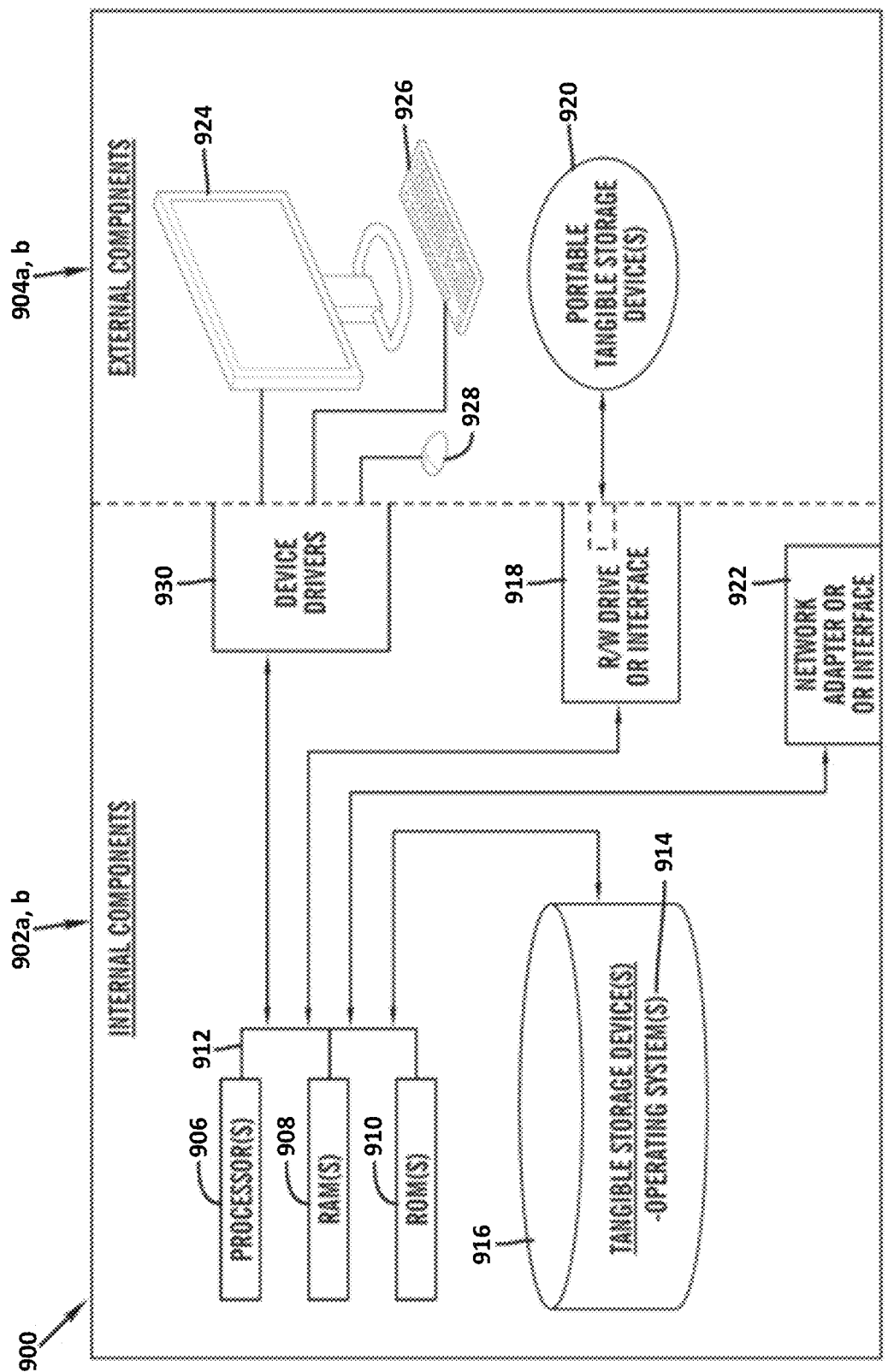
FIG. 8 is a block diagram of internal and external components of computers and servers depicted in FIG. 1 according to at least one embodiment.

FIG. 8 is a block diagram 900 of internal and external components of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a,b and external components 904a,b illustrated in FIG. 8. Each of the sets of internal components 902a,b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the leader-follower program 110a in client computer 102, and the leader-follower program 110b in network server 112, may be stored on one or more computer-readable tangible storage devices 916 for execution by one or more processors 906 via one or more RAMs 908 (which typically include cache memory). In the embodiment illustrated in FIG. 8, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a,b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the leader-follower program 110a and 110b can be stored on one or more of the respective portable computer-readable tangible storage devices 920, read via the respective R/W drive or interface 918, and loaded into the respective hard drive 916.

Each set of internal components 902a,b may also include network adapters (or switch port cards) or interfaces 922 such as a TCP/IP adapter cards, wireless wi-fi interface cards, or 3G or 4G wireless interface cards or other wired or wireless communication links. The software program 108 and the leader-follower program 110a in client computer 102 and the leader-follower program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the leader-follower program 110a in client computer 102 and the leader-follower program 110b in network server computer 112 are loaded into the respective hard drive 916. The network may comprise copper wires, optical fibers, wireless transmission, routers, firewalls, switches, gateway computers and/or edge servers.

Each of the sets of external components 904a,b can include a computer display monitor 924, a keyboard 926, and a computer mouse 928. External components 904a,b can also include touch screens, virtual keyboards, touch pads, pointing devices, and other human interface devices. Each of the sets of internal components 902a,b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
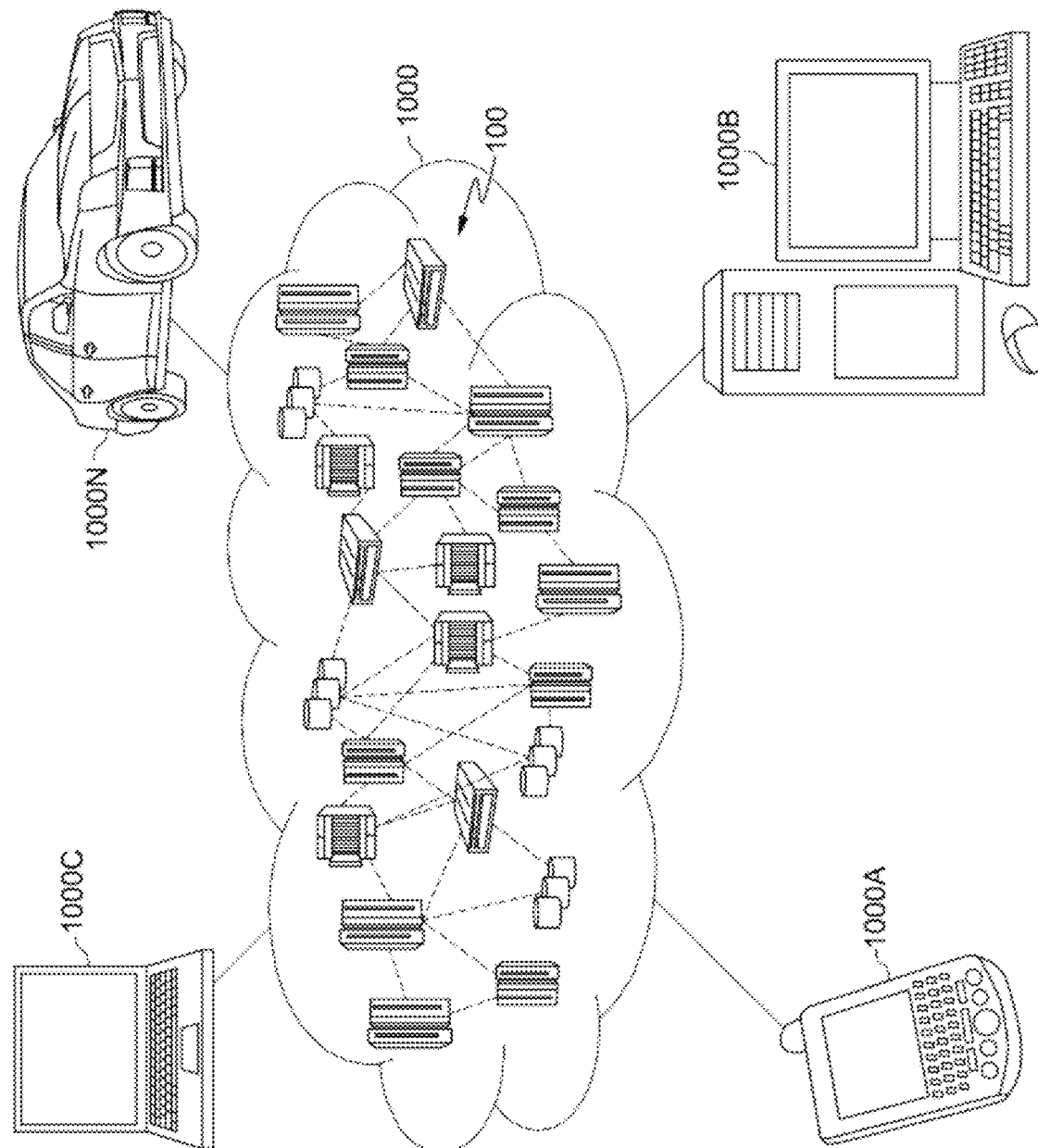
FIG. 9 is a block diagram of an illustrative cloud computing environment including the computer system depicted in FIG. 1, in accordance with an embodiment of the present disclosure.

Referring now to FIG. 9, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 9 are intended to be illustrative only and that computing nodes 100 and cloud computing environment 1000 can communicate with any type of computerized device over any type of network and/or network addressable connection (e.g., using a web browser).

Figure 10:
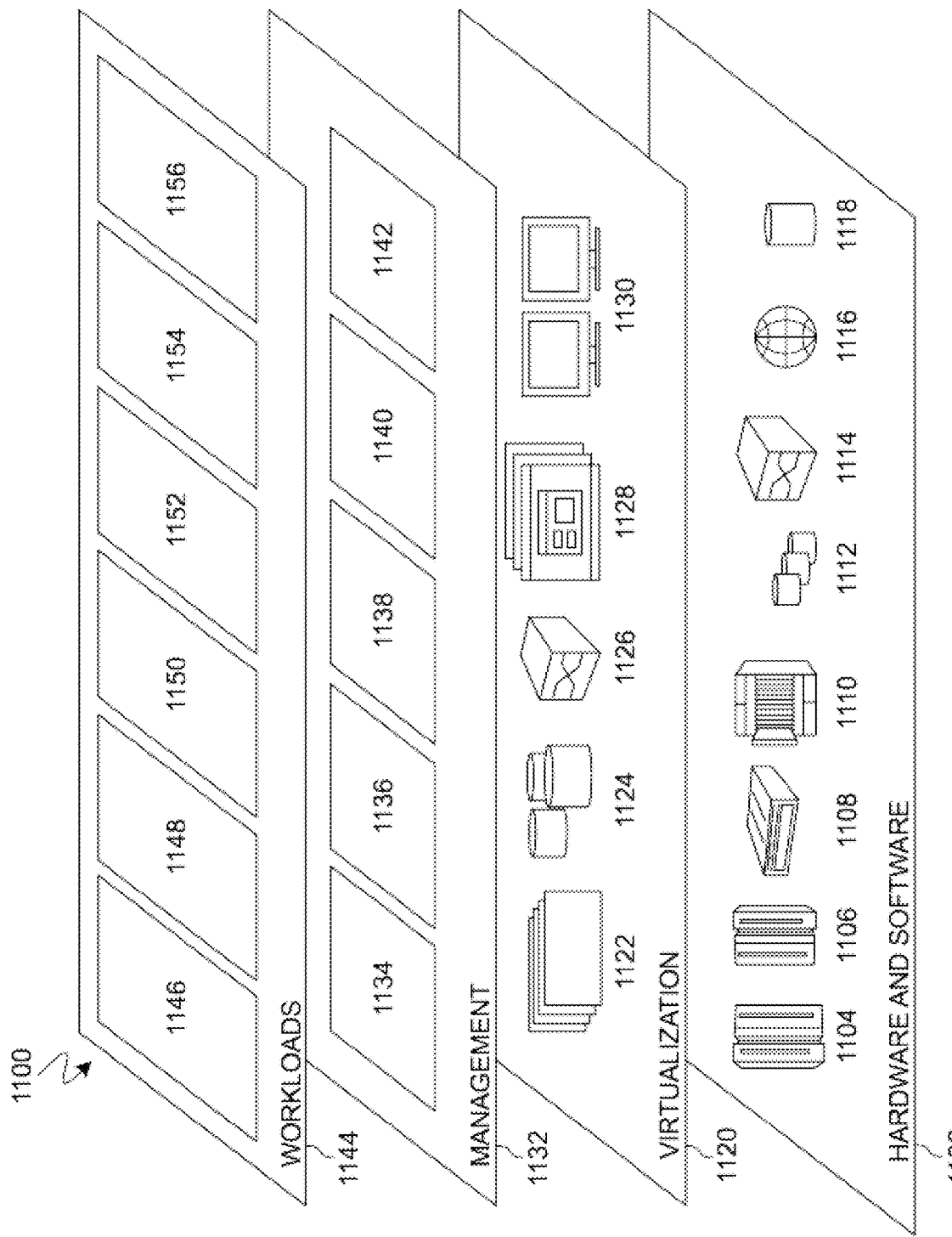
FIG. 10 is a block diagram of functional layers of the illustrative cloud computing environment of FIG. 9, in accordance with an embodiment of the present disclosure.

Referring now to FIG. 10, a set of functional abstraction layers 1100 provided by cloud computing environment 1000 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and leader-follower determination 1156. A leader-follower program 110a, 110b provides a way to calculate a product drag effect and identify leader (e.g., those that drag the purchase of other products) and follower products (e.g., those that are dragged by the purchase of other products).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented on a processing device configured to execute the method, the method automatically determining a temporary price drop of an item for purchase, the method comprising:
   receiving, by the processing device, a plurality of transaction record data;
   receiving tuning, by the processing device, of at least one of a plurality of parameters, from a user, based on the received transaction record data;
   determining, by the processing device, a product drag frequency, indicating a number of the plurality of transactions in which both the item for purchase and a second item occur, based on the parameter tuning and received transaction record data, by constructing a complete directed graph which ranks a top-k list of leader products in decreasing order of out degrees, and a top-k list of follower products in decreasing order of in degrees;
   calculating, by the processing device, a drag probability based on the determined product drag frequency;
   receiving, by the processing device, a query from the user to obtain at least one observation relating to the item for purchase from the calculated drag probability, based on a user-specified analysis;
   reducing, by the processing device, a price of the item for purchase based on the received user query; and
   outputting, by the processing device, the reduced price of the item to the user.

2. The method of claim 1, wherein the plurality of tuned parameters is selected from the group consisting of one or more physical product attributes, one or more physical parameters, and one or more analytic parameters.

3. The method of claim 1, wherein the complete directed graph has a plurality of edges based on the plurality of transaction record data wherein a product rank is based on a sum of weights on incoming or outgoing arcs, or on a corresponding edge weight in a complete directed graph, and wherein a top portion of the complete directed graph depicts a leader product and a bottom portion of the complete directed graph depicts a follower product.

4. The method of claim 3, wherein the drag probability is calculated by translating the determined product drag frequency, represented in a frequency matrix, into a corresponding probability, represented in a doubly stochastic probability matrix, such that the sum of every row and column in the probability matrix is equal to one.

5. The method of claim 4, further comprising:
   determining, by the processing device, a magnitude of pairwise drag effect based on the calculated drag probability.

6. The method of claim 1, wherein the at least one observation from the calculated drag probability includes a leader and follower score, a top-k list of local leader products, a top-k list of local follower products, a top-k list of global leader products, and a top-k list of global follower products.

7. The method of claim 1, wherein the output is customizable by the user.

8. A computer system for automatically determining a temporary price drop of an item for purchase, the method comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving, by the one or more processors, a plurality of transaction record data;
   receiving tuning, by the one or more processors, of at least one of a plurality of parameters, from a user, based on the received transaction record data;
   determining, by the one or more processors, a product drag frequency, indicating a number of the plurality of transactions in which both the item for purchase and a second item occur, based on the parameter tuning and received transaction record data, by constructing a complete directed graph which ranks a top-k list of leader products in decreasing order of out degrees, and a top-k list of follower products in decreasing order of in degrees;
   calculating, by the one or more processors, a drag probability based on the determined product drag frequency;
   receiving, by the one or more processors, a query from the user to obtain at least one observation relating to the item for purchase from the calculated drag probability, based on a user-specified analysis;
   reducing, by the one or more processors, a price of the item for purchase based on the received user query; and
   outputting, by the one or more processors, the reduced price of the item to the user.

9. The computer system of claim 8, wherein the plurality of tuned parameters is selected from the group consisting of one or more physical product attributes, one or more physical parameters, and one or more analytic parameters.

10. The computer system of claim 8, wherein the complete directed graph has a plurality of edges based on the plurality of transaction record data wherein a product rank is based on a sum of weights on incoming or outgoing arcs, or on a corresponding edge weight in a complete directed graph, and wherein a top portion of the complete directed graph depicts a leader product and a bottom portion of the complete directed graph depicts a follower product.

11. The computer system of claim 10, wherein the drag probability is calculated by translating the determined product drag frequency, represented in a frequency matrix, into a corresponding probability, represented in a doubly stochastic probability matrix, such that the sum of every row and column in the probability matrix is equal to one.

12. The computer system of claim 11, further comprising: determining, by the one or more processors, a magnitude of pairwise drag effect based on the calculated drag probability.

13. The computer system of claim 8, wherein the at least one observation from the calculated drag probability includes a leader and follower score, a top-k list of local leader products, a top-k list of local follower products, a top-k list of global leader products, and a top-k list of global follower products.

14. The computer system of claim 8, wherein the output is customizable by the user.

15. A computer program product for automatically determining a temporary price drop of an item for purchase, the method comprising:
one or more computer-readable storage media and program instructions stored on at least one of the one or more tangible storage media, the program instructions executable by a processor to cause the processor to perform a method comprising:
receiving, by the processor, a plurality of transaction record data;
receiving tuning, by the processor, of at least one of a plurality of parameters, from a user, based on the received transaction record data;
determining, by the processor, a product drag frequency, indicating a number of the plurality of transactions in which both the item for purchase and a second item occur, based on the parameter tuning and received transaction record data, by constructing a complete directed graph which ranks a top-k list of leader products in decreasing order of out degrees, and a top-k list of follower products in decreasing order of in degrees;
calculating, by the processor, a drag probability based on the determined product drag frequency;
receiving, by the processor, a query from the user to obtain at least one observation relating to the item for purchase from the calculated drag probability, based on a user-specified analysis;
reducing, by the processor, a price of the item for purchase based on the received user query; and
outputting, by the processor, the reduced price of the item to the user.

16. The computer program product of claim 15, wherein the plurality of tuned parameters is selected from the group consisting of one or more physical product attributes, one or more physical parameters, and one or more analytic parameters.

17. The computer program product of claim 15, wherein the complete directed graph has a plurality of edges based on the plurality of transaction record data wherein a product rank is based on a sum of weights on incoming or outgoing arcs, or on a corresponding edge weight in a complete directed graph, and wherein a top portion of the complete directed graph depicts a leader product and a bottom portion of the complete directed graph depicts a follower product.

18. The computer program product of claim 17, wherein the drag probability is calculated by translating the determined product drag frequency, represented in a frequency matrix, into a corresponding probability, represented in a doubly stochastic probability matrix, such that the sum of every row and column in the probability matrix is equal to one.

19. The computer program product of claim 18, further comprising:
determining, by the processor, a magnitude of pairwise drag effect based on the calculated drag probability.

20. The computer program product of claim 15, wherein the at least one observation from the calculated drag probability includes a leader and follower score, a top-k list of local leader products, a top-k list of local follower products, a top-k list of global leader products, and a top-k list of global follower products.

* * * * *